US009562768B2

(12) United States Patent
Safar (10) Patent No.: US 9,562,768 B2
(45) Date of Patent: Feb. 7, 2017

(54) ACTIVE WAVEGUIDE OPTICAL GYROSCOPE

(71) Applicant: LGS Innovations LLC, Herndon, VA (US)

(72) Inventor: Hugo F Safar, Westfield, NJ (US)

(73) Assignee: LGS INNOVATIONS LLC, Herndon, VA (US)

( * ) Notice: Subject to any disclaimer, the term of this patent is extended or adjusted under 35 U.S.C. 154(b) by 88 days.

(21) Appl. No.: 14/579,948

(22) Filed: Dec. 22, 2014

(65) Prior Publication Data

US 2016/0178375 A1    Jun. 23, 2016

(51) Int. Cl.
*G01C 19/66* (2006.01)
*G01C 19/72* (2006.01)

(52) U.S. Cl.
CPC ............. *G01C 19/728* (2013.01); *G01C 19/72* (2013.01)

(58) Field of Classification Search
CPC ..... G01C 19/04; G01C 19/661; G01C 19/662; G01C 19/664; G01C 19/68; G01C 19/72
USPC ........................................ 356/460, 468, 472
See application file for complete search history.

(56) References Cited

U.S. PATENT DOCUMENTS

| 4,884,112 | A | 11/1989 | Lorenzo et al. | |
| 5,189,488 | A | 2/1993 | Mark et al. | |
| 5,293,439 | A * | 3/1994 | Mori | G01C 19/725 385/11 |
| 5,408,492 | A * | 4/1995 | Vossler | G01C 19/66 356/461 |
| 5,887,009 | A | 3/1999 | Mandella et al. | |
| 6,377,351 | B1 * | 4/2002 | Kim | G01C 19/72 356/460 |
| 7,710,575 | B2 | 5/2010 | Schwartz et al. | |
| 8,351,046 | B2 | 1/2013 | Justin | |
| 2008/0291459 | A1 | 11/2008 | Meyer et al. | |
| 2009/0046294 | A1 * | 2/2009 | Kaplan | G01C 19/72 356/460 |

OTHER PUBLICATIONS

Ciminelli et al., "High-Q Spiral Resonator for Optical Gyroscope Applications: Numerical and Experimental Investigation," IEEE Photonics Journal, vol. 4, No. 5, Oct. 2012.

\* cited by examiner

*Primary Examiner* — Jonathan Hansen
(74) *Attorney, Agent, or Firm* — Baker and Hostetler LLP (57) ABSTRACT

The present application is directed an optical gyroscope. The optical gyroscope includes a substrate including a first and a second waveguide disposed thereon. One or both of the waveguides may be doped with a rare-earth material. A crossing element is disposed between the first and the second waveguides to form a substantially orthogonal connection therebetween. The application is also directed to a system including an optical gyroscope. The application is further directed to a method of observing characteristics of the optical gyroscope.

20 Claims, 6 Drawing Sheets

ACTIVE WAVEGUIDE OPTICAL GYROSCOPE

BACKGROUND

1. Field

This application is generally related to an optical gyroscope apparatus and a system employing an optical gyroscope apparatus. The application is also related to a method for observing sensitivity of an optical gyroscope.

2. Related Art

Over the last decade, efforts have been made to improve the sensitivity of optical gyroscopes. Gyroscopes are devices for measuring rotation rates or changes in angular velocity about an axis of rotation. Rotation about the axis normal to the waveguide either slows or speeds the propagation of light through the waveguide, resulting in a measurable shift in phase of the light. Namely, a loop of the optical waveguide is employed in view of principles of the Sagnac effect to measure the interference of counter-propagating waves therein. Interference is affected when the plane of the loop is tilted. That is, one wave "experiences" a shorter optical path thereby changing the interference with the other wave.

The sensitivity of an interferometric gyroscope depends upon its length L and loop diameter D as described in equation (1) below. Namely large L and D values directly improve performance by reducing the minimum detectable change in angular rotation $\delta\Omega$. An interferometric gyroscope is operated with a source at center wavelength $\lambda_0$ and power P of photon energy hv that is detected by a photodetector with quantum efficiency h and integration time t.

$$\delta\Omega = \frac{c\lambda_0}{2LD}\left(\frac{hv}{P\eta\tau}\right)^{1/2} \text{ in rad/s} \qquad (1)$$

In view of equation (1), conventional gyroscopes have lengths tens of meters in length to reduce angular rotation. This length may even extend in excess of 1 kilometer based upon the desired sensitivity of the gyroscope. Accordingly, conventional gyroscopes tend to be bulky and expensive.

Generally, optical waveguides in photonic integrated circuits (PICs) are fabricated by lithographically patterning a substrate upon which one or more optical components are integrated. The substrate is generally made of silicon and may include a silica layer formed through thermal or native oxidation. However, silicon and silicon dioxide waveguides exhibit very high background losses of about 1 dB/cm. In practice, this limits the sensitivity of the gyroscope device.

What is desired in the art is a waveguide-based gyroscope apparatus exhibiting improved sensitivity characteristics.

What is also desired in the art is a waveguide-based gyroscope that is compact.

What is further desired in the art is a waveguide-based gyroscope that is inexpensive to commercially manufacture.

SUMMARY

The foregoing needs are met, to a great extent, by the invention, with an optical gyroscope apparatus, a system including an optical gyroscope, and a method for observing characteristics of an optical gyroscope.

One embodiment of the application is directed to an optical gyroscope. The optical gyroscope includes a substrate. Disposed on the substrate is a first waveguide. The first waveguide may be doped with a rare-earth material. A second waveguide may also be disposed on the substrate. Further a crossing element is disposed between the first and the second waveguides to form a substantially orthogonal connection therebetween. In one embodiment, the second waveguide is also doped with rare-earth material. In another embodiment, the first and the second waveguides bend to form a loop via the crossing element.

Another embodiment of the application is directed to a system. The system includes a light source for emitting light into an optical gyroscope. The system also includes a wavelength division multiplexer having an inlet and an outlet. The inlet of the wavelength division multiplexer is in optical communication with the light source and is adapted to receive light therefrom. The optical gyroscope includes an inlet and an outlet. The inlet is in optical communication with the wavelength division multiplexer and is adapted to receive light exiting the outlet of the wavelength division multiplexer. The optical gyroscope includes a substrate, a first waveguide and a second waveguide disposed on the substrate, and a crossing element that couples the first and the second waveguides. The system also includes first and second photodetectors that receive optical signals from the optical gyroscope. The first photodetector is adapted to detect intensity of light entering the optical gyroscope. The second photodetector is adapted to detect a signal exiting the outlet of the optical gyroscope. The system further includes a lock-in amplifier that is connected to the first and the second photodetectors. The lock-in amplifier is adapted to measure signals exiting from each of the first and the second photodetectors.

Yet another embodiment of the application is directed to a method for observing optical characteristics of an optical gyroscope. The method includes a step of providing an optical gyroscope that includes a substrate with a first and a second waveguide disposed on the substrate. The first waveguide is doped with a rare-earth material. A crossing element connects the first and the second waveguides. The method also includes a step of transmitting light through the first and the second waveguides in the optical gyroscope. Further, the method includes a step of detecting a signal exiting from an outlet of the optical gyroscope. In one embodiment, the detected signal exhibits a resolution less than about 10°/h. According to another embodiment, the light is transmitted from a signal source and a pump source, each emitting a wavelength of light. According to even another embodiment, the wavelength of light emitted by the signal source ranges from about 1000 to 2100 nm, and the wavelength of light emitted by the pump source ranges from about 800 to 1000 nm.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

It has been determined by the inventors and described herein that sensitivity characteristics of an optical gyroscope may be improved by employing specific dopants for making an active waveguide. These new waveguides can be made to be very long with minimal background loss. In addition, improved sensitivity characteristics of the optical gyroscope may also be contributed by crossing elements configured to connect plural waveguides together. By so doing, little or no path interference is observed. Hence, an optical gyroscope may improve sensitivity characteristics while maintaining an overall small footprint.

According to the present application, the optical gyroscope may be employed in a plurality of applications requiring high-performance angular velocity sensors. For example, the optical gyroscope may be used in the field of inertial navigation. This may include micro- and nano-satellites. This may also include any type of air/earth/water moving craft, such as for example, planes, automobiles and ships, relying on inertial navigation by "Dead Reckoning" in GPS-degraded environments.

Figure 1A:
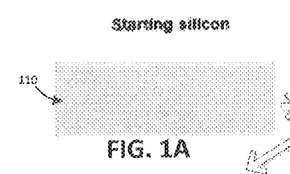
FIGS. 1A-1E illustrates a schematic for forming an optical gyroscope according to an embodiment of the present application.

According to an embodiment as illustrated in FIGS. 1A-1E, a method 100 is described for making a waveguide on a substrate. The substrate may be porous. Alternatively the substrate may be nonporous. As depicted in FIG. 1A, the substrate 110 comprises silicon. The substrate may also comprise other materials including but not limited to quartz, sapphire, gallium-arsenide, silicon carbide, indium-phosphide, and gallium-nitride.

The substrate 120 may be a conductive or semi-conductive material such as a semiconductor wafer or a metal layer. The substrate 120 may be thermally conductive. When the substrate 120 is a semiconductor, it may be doped or intrinsic.

FIG. 1A illustrates an embodiment of an optical device 100. The optical device 100 includes a substrate 110. The substrate 110 may include one or more dielectric layers formed thereon. The dielectric layer may include one or more material layers, e.g., silicon oxide or silicon nitride.

Figure 1B:
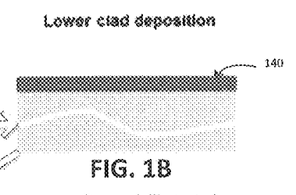

A cladding layer 140 may overlay the substrate 110 or a dielectric layer as depicted in FIG. 1B. The cladding layer 140 may also include one or more dielectric layers, e.g., silicon oxide or silicon nitride. The dielectric layer and the cladding layer 130 may be formed from the same or different materials. These layers may include carbon or fluorine doped silicates when a lower refractive index of these layers is desired. Optionally the cladding layer 140 may be omitted, in which case the cladding may be, e.g., air. In some embodiments the substrate 110 and the dielectric layer are conveniently provided as silicon on insulator (SOI) wafer.

Figure 1C:
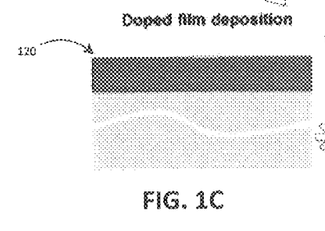
Figure 1D:
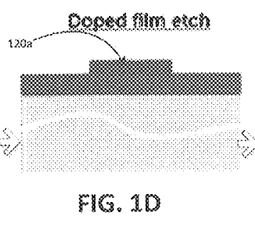

In one embodiment, the cladding material 140 may be a lower cladding layer having a lower index of refraction than a subsequently doped film deposited thereon 120 as shown in FIG. 1C. The doped film 120 is a precursor to an active waveguide 120a as shown in FIG. 1D. In one embodiment, the doped film deposition 120 is etched to form a planar waveguide. The planar waveguide is adapted to transmit light therethrough from an inlet to an outlet. The width of the waveguide is not limited to a particular value. However, when the refractive index difference between the waveguide 120a and the lower cladding layer 140 or an upper cladding layer 150 is high, the waveguide index is at least 2 times that of the cladding layers' 140/150 refractive index. In another embodiment, the width of the waveguide 120a may be significantly smaller than the wavelength of the optical signal propagating therein.

Figure 1E:
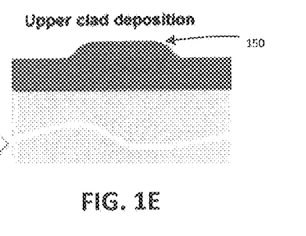

As illustrated in FIG. 1E, the planar waveguide 120a is embedded between an upper cladding layer 150 deposited thereon and a lower cladding layer 140 formed therebelow. The upper cladding material 150 is typically formed of the same material as the lower cladding material 140. Alternatively, the upper cladding 150 material may be formed of a material that is different from the lower cladding material 140. The upper and lower claddings may be formed of materials such as dielectrics.

The waveguide 120a may be formed of a semiconducting material, e.g., Si, Ge, GaAs, CdTe, GaP, InP, or InAs. The waveguide may also include a material such as silica glass, alumina or silica. This material may be doped. The dopant may be selected from boron, germanium, phosphor, aluminum, and their combinations, as well as alkali metals such as sodium, lithium, potassium, rubidium, cesium and their combinations.

In another embodiment, the waveguide 120a may also be doped with a rare-earth material. For example, the rare-earth material may include but is not limited to elements selected from yttrium, lanthanum, cerium, praseodymium, neodymium, promethium, samarium, europium, gadolinium, terbium, dysprosium, holmium, erbium, thulium, ytterbium, lutetium and combinations thereof. The amount of rare-earth dopant may vary depending upon the element employed. For example, the amount of dopant present in the waveguide may range from about $1\times10^{19}$ ions/cm$^3$ to $1\times10^{21}$ ions/cm$^3$.

Figure 2:
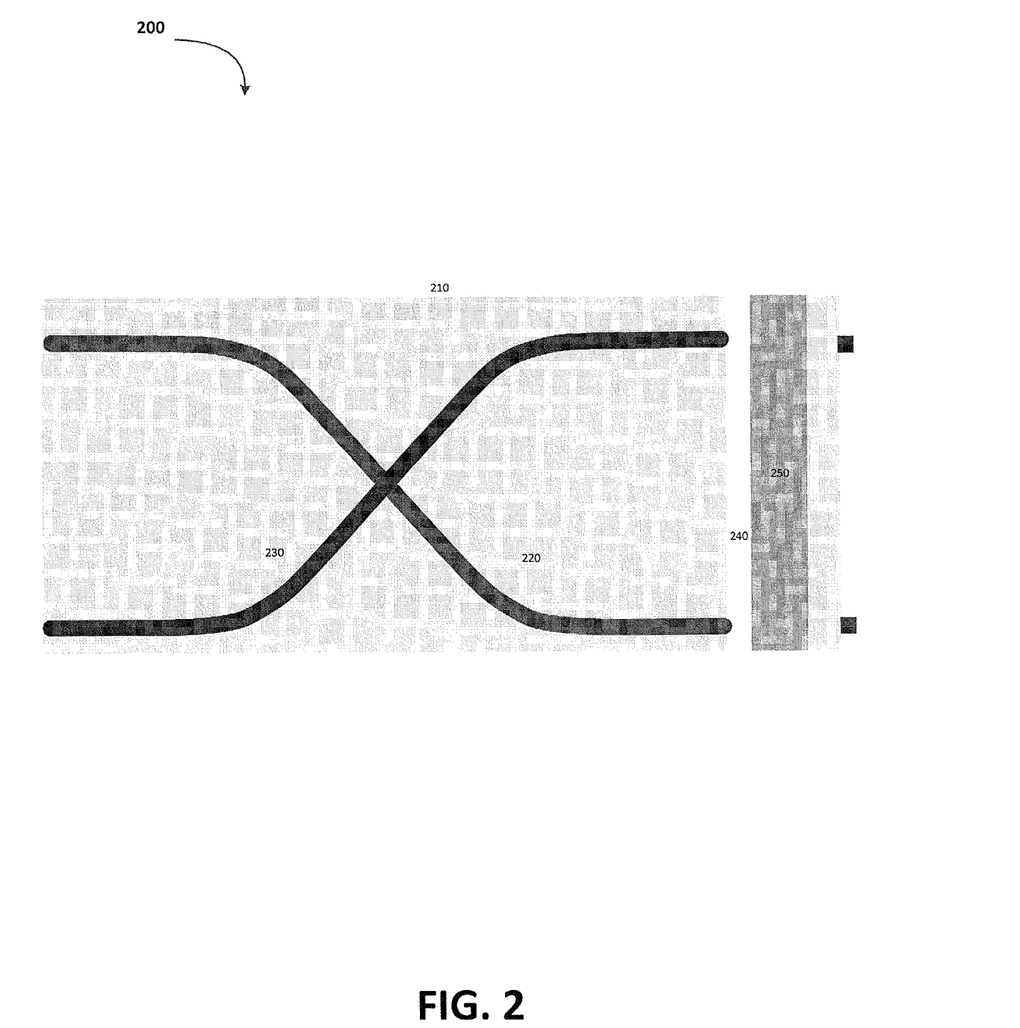
FIG. 2 illustrates an optical gyroscope according to an embodiment of the present application.

According to another aspect of the application, an optical gyroscope 200 is illustrated in FIG. 2. Namely, the optical gyroscope includes a substrate 210, and is similar to the substrate 110 described above. Moreover, the optical gyroscope 200 includes plural waveguides, particularly waveguides 220, 230. The waveguides may be positioned such that they are substantially parallel to one another. The waveguides are embedded between the lower 240 and upper 250 cladding layers. The cladding layers 240, 250 are illustrated on the right hand side of FIG. 2 which is a two-dimensional representation of the optical gyroscope. While the width of the upper cladding layer 250 is depicted as being larger than the width of the lower cladding layer 240, it is envisaged that the thickness in a three-dimensional representation corresponding to the width may be formed of any thickness for purposes of embedding the waveguides 220, 230.

In an embodiment, one or more of the waveguides 220 and 230 may include a core that is doped with a rare-earth material as described above with respect to waveguides 120/120*a*. The rare-earth doped active waveguide(s) 220, 230 exhibits a higher index of refraction than either of the lower 240 and upper 250 cladding layers. As illustrated, the waveguides 220, 230 cross one another, such as for example, in a 'X' formation. In an embodiment, the crossing is a physical coupling of the waveguides 220, 230. The physical coupling may result in the waveguides bending to form one or more loops. As a result of the 90° angle formed by the coupling, the optical modes of each waveguide are independent. Accordingly, light traveling through one waveguide does not leak into the second waveguide when travelling through the crossing.

As will be discussed in more detail below, the optical gyroscope 200 has a very small size, e.g., footprint. Namely, these optical gyroscopes may be employed for use in the field of microelectronics where small surface areas are needed. For example, the footprint of the gyroscope 200 may be less than about 50 cm². In a preferred embodiment, it may be less than about 25 cm². More preferably, the optical gyroscope may be less than about 10 cm². Even more preferably, the optical gyroscope may be less than about 1 cm².

Figure 3A:
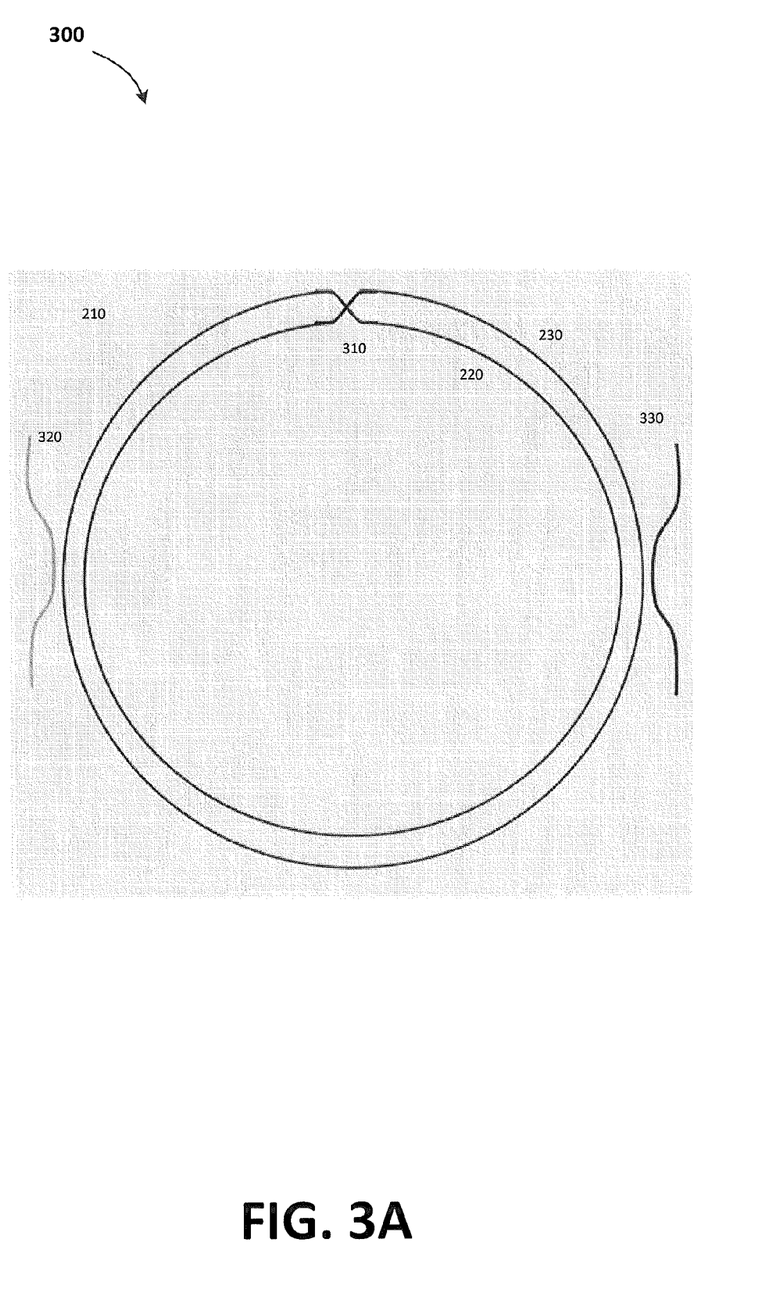
FIG. 3A illustrates an optical gyroscope according to an embodiment of the application.

In yet another embodiment as illustrated in FIG. 3A, an optical gyroscope 300 may be configured such that the optical waveguides 220, 230 are formed in the shape of a closed loop on the substrate 210. As shown in FIG. 3A, there are two loops. As shown, the loop is a closed figure, like a circle, or an oval. It is envisaged according to this application that other configurations of the plural active waveguides may be employed. For example, the waveguide may be in the shape of a coil or an 'S'. The configuration may also be dependent upon the size the substrate 210 employed for the optical gyroscope 300.

The optical gyroscope 300 also includes a crossing element 310. The crossing element 310 is adapted to couple at least two waveguides. As shown in FIG. 3A, the crossing element 310 physically couples two waveguides 220, 230. In an embodiment, the coupling element 310 is a cross shaped element, forming a substantially orthogonal, physical connection between the first and second waveguides 220, 230. Substantially is understood according to this application to be within 5 degrees, e.g., 85-95°. More preferably, substantially is understood to be between 88° and 92°, and even more preferably 89° and 91°. In a most preferred embodiment, the first and the second waveguides form an orthogonal coupling arrangement.

The crossing element 310 used in this application may be made of any material that is optically compliant with the first and the second waveguides, 220, 230. For example, the crossing element may be formed of a semiconducting material, e.g., Si, Ge, GaAs, CdTe, GaP, InP, or InAs. The crossing element may also include a material such as silica glass, alumina or silica. In another embodiment, the crossing element may be doped. The dopant may be selected from boron, germanium, phosphor, aluminum, and alkali metals such as sodium, lithium, potassium, rubidium, cesium and combinations thereof. In yet another embodiment, the crossing element may be doped with a rare-earth material. This may include but is not limited to elements selected from yttrium, lanthanum, cerium, praseodymium, neodymium, promethium, samarium, europium, gadolinium, terbium, dysprosium, holmium, erbium, thulium, ytterbium, lutetium and combinations thereof. The amount of the rare-earth dopant used may vary depending upon the element employed and the ultimate use of the device.

The crossing element 310 may also be formed such that its size forms a coupling arrangement between the first and the second waveguides 220, 230. In an embodiment, the coupling element 310 has four (4) ends. Each end is open and configured to mate with an end of the waveguide. The point of coupling between the crossing element 310 and the waveguide may result in a turn or angle. The angle is preferably an obtuse angle. As shown in FIG. 3A, there are two open ends for each waveguide.

Figure 3B:
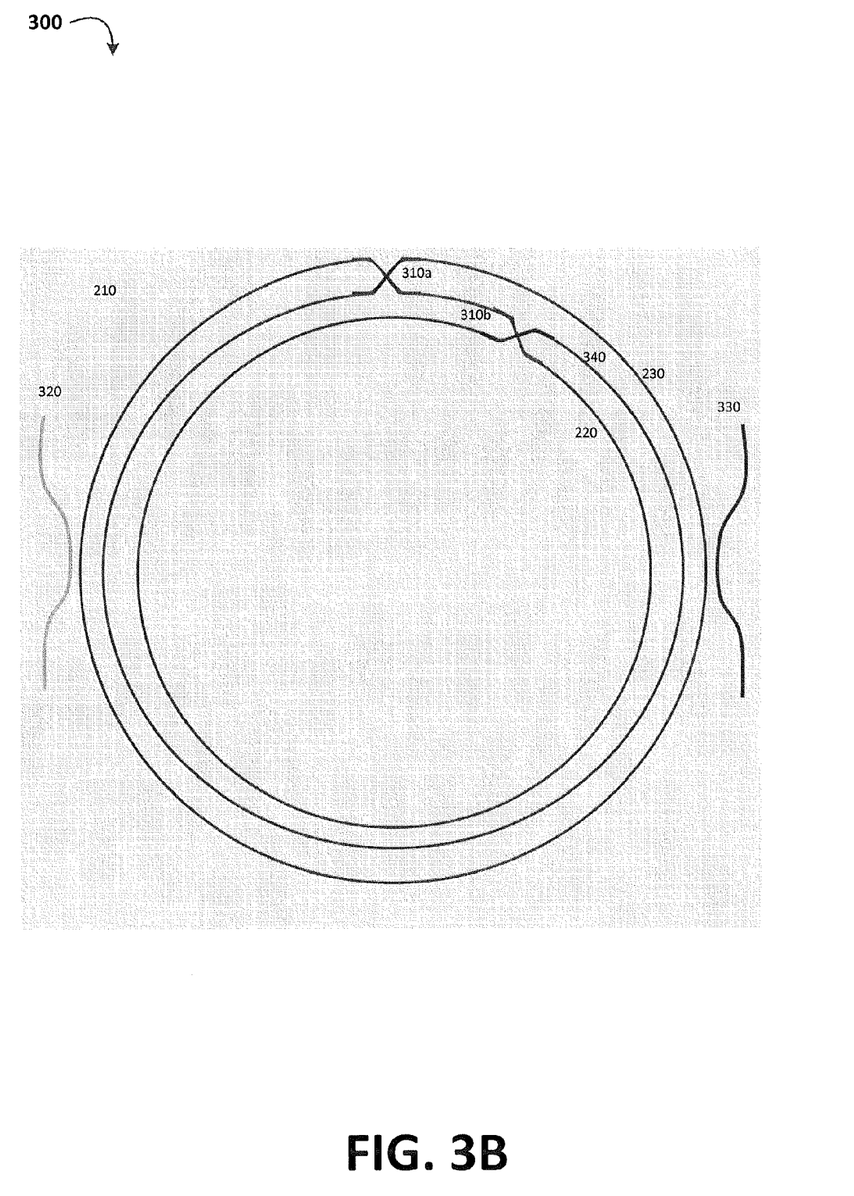
FIG. 3B illustrates an optical gyroscope according to an embodiment of the application.

As further shown in FIG. 3B, the optical gyroscope 300 includes two coupling ports 320, 330. One of the ports, such as for example coupling port 320, may be employed as an inlet for optical signals. That is, the inlet is configured to allow light to be transmitted through the optical gyroscope 300. Specifically, light from a light source, as discussed in more detail below, emits light that contacts a core of the waveguide preferably doped with a dopant, such as for example, a rare-earth material. This produces an amplified spontaneous emission or a superfluoroescent signal. The other coupling port, such as for example, coupling port 330, may be an outlet for an optical signal incident on the active waveguide.

According to yet another embodiment, the optical gyroscope 300 may be depicted as having multiple crossing elements as illustrated in FIG. 3B. Specifically, the crossing elements are referenced as indicators 310*a* and 310*b*. The optical gyroscope 300 may also be configured to include two or more waveguides. The third waveguide is referenced as indicator 340.

The present application is envisaged to include as many waveguides and crossing elements that may conceivably be formed within the footprint of the substrate 210. For example, for a substrate that is about 50 cm² at least 2, at least 5, and even at least 20 waveguides may be formed thereon. The multiple waveguides may be formed substantially parallel to one another. They may also be formed in the shape of a closed loop. The length of each waveguide may for example be at least 1 meter, at least 10 meters, at least 100 meters and even at least 1 kilometer in length. According to an embodiment, the relationship between the number of crossing elements disposed between two or more active waveguides disposed on the substrate 210 in the optical gyroscope 300 is determined by the equation "crossing element=number of waveguides−1." According to even another embodiment, the relationship between a number of crossing elements and a number of loops formed on the substrate in the optical gyroscope 300 determined by the equation "crossing element=number of loops−1."

Figure 4:
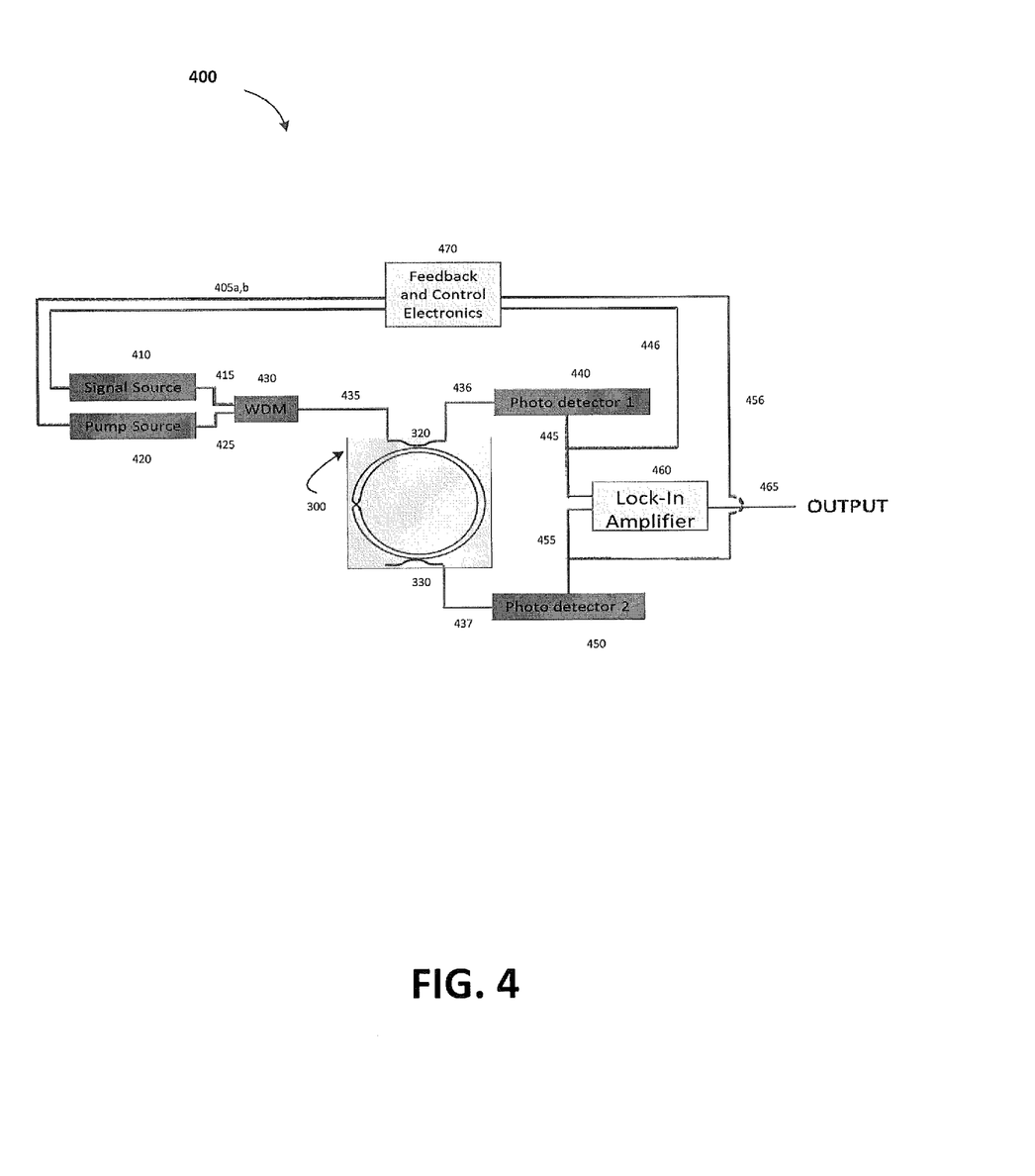
FIG. 4 illustrates a system including an optical gyroscope according to an embodiment of the application.

In a further aspect of this application, a system 400 for observing sensitivity of an optical gyroscope 300 is illustrated in FIG. 4. The system 400 may include one or more of the following elements, such as for example, a feedback and control electronics component 470, a light source such as a signal source 410 and a pump source 420, a wavelength demultiplexer 430, one or more photodetectors 440, 450, and a lock-in amplifier 460. The system may also include one or more electrical and optical paths for connecting or communicating between the above-mentioned components. Each of these components will be discussed in more detail below. Absent any expressly described deviations with these components, they will operate according to ordinary and customary function as commonly known to those skilled in the art.

The feedback and control apparatus 470 controls the intensity of light via electrical signals that are transmitted to the optical gyroscope. The feedback and control apparatus 470 may include any hardware known in the art that is configured to provide electrical signals to the light source. Moreover, the apparatus 470 is known to augment these electrical signals based upon feedback via signals it receives from photodetectors in communication with the optical gyroscope.

The feedback and control apparatus 470 sends an electric signal along an electrical path to the light source. In particular, the light source includes two separate sources, a signal source 410 and a pump source 420. The electrical signals entering the light sources 410, 420 are read, and subsequently converted to optical signals.

The signal source 410 may include, for example, a solid-state, single-longitudinal-mode laser such as a superluminescent diode which produces a relatively high-power, broad-band beam of coherent light. The signal source 410 used in the application may be a Qphotonics QFBGLD-1550-10.

A wavelength of light from the signal source is sent via an electrical path 415 to the wavelength demultiplexer 430 and combined with light from a pump source 420. The pump source 420 may be located upstream, downstream or in line with the signal source 410. The pump source 420 used in the application may be a QPhotonicsQFBGLD-980-250. The pump source may emit light at a wavelength that amplifies the signal source wavelength and is sent to the WDM 430 vial line 425.

According to an embodiment, the pump source 420 may be a multi-mode pump source operating at a wavelength to pump the rare-earth-doped active waveguide, e.g., 808 nm, 915 nm or 975 nm. For example, a single fiber-pigtailed laser diode, diode bar or multi-emit pump source may be commercially supplied by Fianium Ltd, which delivers between 20 and 40 W within a single, 105 μm core, 0.22 NA pump delivery fiber. Where multi-mode pump delivery fibers are used, the pump signal combiner will typically include a conventional tapered bundle, such as those commercially available from OFS or Sifam Fiber Optics. Alternatively, the pump signal combiner may be a tapered coupler, a side-pumping fiber configuration, or a distributed pump coupling fiber configuration. In the multi-mode pumping regime, the amplifier fiber generally comprises a double-clad fiber structure where the signal pulses are guided within a signal core and the pump light is guided within the fiber cladding.

In another embodiment, the pump source 420 may be a single mode pump source such as a fiber pigtailed laser diode or a fiber laser. The fiber laser can be a Raman fiber laser or could be a cladding pumped fiber laser generating cw or pulsed radiation at the wavelength required to pump the rare-earth-doped amplifier fiber.

Based upon experimentation, by adjusting the pump and light signal intensities, an ideal situation may be obtained wherein light amplification compensates for the background loss in the active waveguides that are doped with a rare-earth material as discussed above in this application. For example, erbium-doped waveguides may be emitted with light from a pump at wavelengths between 960 and 990 nm, or between 1450 and 1490 nm. The signal source may have light emitted between about 1530 and 1560 nm. Waveguides doped with Ytterbium may have light emitted from a pump between about 970 to 990 nm. The signal source may have light emitted at about 1000 to 1100 nm. In another embodiment, a waveguide doped with thulium may have light emitted from a pump between about 800 to 900 nm or alternatively between about 1150 1250 nm. The signal source may have light emitted between about 1700 2100 nm.

According to another embodiment, the pump 410 and/or the signal 420 sources may include a first Bragg grating arranged to function as an optical reflector located near the first end of the rare earth doped waveguide and a second Bragg grating arranged to function as an optical reflector located between the first end of the rare earth doped waveguide and a crossing element, the second Bragg grating being partially transmissive to allow an optical signal to be output from the rare-earth doped optical waveguide.

The light from the signal 410 and the pump 420 sources is then sent to a wavelength demultiplexer (WDM) 430 along optical paths 415 and 425, respectively. WDM separates the received light into two output components that can be further processed to ascertain a variation of the input light from a center wavelength of the multiplexer. By providing light from the signal light source and from the pump source to the WDM, variations in source light wavelength can be determined. These variations, in turn, can be used to adjust the scale factor of the gyroscope and/or to otherwise adjust the sensor output of the optical gyroscope.

As wavelength fluctuations may be observed and compensated, the need to precisely control the source wavelength is significantly reduced or eliminated. In fact, a noticeable improvement in the range of wavelength drift over which the gyroscope is operated can be observed. According to this application, WDM components such as fused WDM couplers or thin-film WDM couplers may be used.

The optical signal/light from the WDM 420 is then sent via an optical path 435 to the optical gyroscope 300 via coupling port 320. The optical signal entering the gyroscope 300 is split into a pair of waves to propagate in clockwise (cw) and counterclockwise (ccw) directions through the waveguides and both ultimately impinge on a photodetector, e.g., second photodetector 450, producing a photocurrent. This photocurrent in the case of two nearly coherent light waves impinging thereon, and follows a raised cosine function in providing a photocurrent output. Rotation 'Ω' about the sensing axis of the device provides an effective optical path length increase in one rotational direction and an optical path length decrease in the other rotational direction for one of these waves. The opposite result occurs for rotation of another wave in the other direction. Such path length differences between the waves introduce a phase shift between these waves for either rotation direction. This is in view of the Sagnac effect. The light propagating through the first and second waveguides in the optical gyroscope 200 contacts the doped rare-earth material and produces an optical signal that is sent through the outlet port 330 to a photodetector 450. According to an embodiment, the optical gyroscope 300 may include a Thermoelectric cooler (TEC) for stabilizing the spectral responses of the gyroscope.

Another end of the coupling port 320 described above is connected via an optical path 436 to the first photodetector 440. The first photodetector 440 monitors the input signal and pump power level. The photodetector may be a photodiode which detects electromagnetic waves or light waves, impinging thereon from the rare-earth doped waveguide. This information is sent via an electrical path to the feedback and control apparatus 470. Moreover, information from the first photodetector 440 is sent via an electrical path 445 to the lock-in amplifier 460.

The second photodetector 450 sends an electrical signal to the feedback and control apparatus 470 via an electrical path 456. Separately, the second photodetector 450 sends an electrical signal via path 455 to a Lock-in Amplifier (LIA). 460. The LIA 460 measures phase shifts of the electrical signals received from the second photodetector 450. Namely, a reference signal is mixed with a detected output signal. By using this synchronous demodulation or phase sensitive detection technique, information about the system can easily be obtained in high-noise environments.

Amplifiers of this type are sensitive to the phase relationship between the input information signal and the reference signal to the lock-in amplifier. An in-phase information signal will provide an output response of one polarity and an out-of-phase relationship will result in an output signal of an opposite polarity. A typical LIA is the PRINCETON APPLIED RESEARCH Model 124A manufactured at Princeton, N.J. Another LIA is manufactured by Stanford Research Instruments, such as for example, model no. SRS830. Amplifiers of this type, typically high Q DC amplifiers, provide a gain of several thousand at the reference or dither frequency and virtually no gain at other frequencies above or below the reference frequency. For an information signal of a fixed level, the amplifier typically provides a fixed DC level response at its output.

The measured output from the LIA 460 is sent via an electrical path 465 to an output. The output may be sent further downstream to a digital section capable of reading the output based upon phase modulation spectroscopy. According to the application, by using the above-described doped waveguides that are efficiently coupled via the orthogonal waveguide crossings, the device is capable of increasing the total product LD according to equation (1) by at least 100 times.

Figure 5:
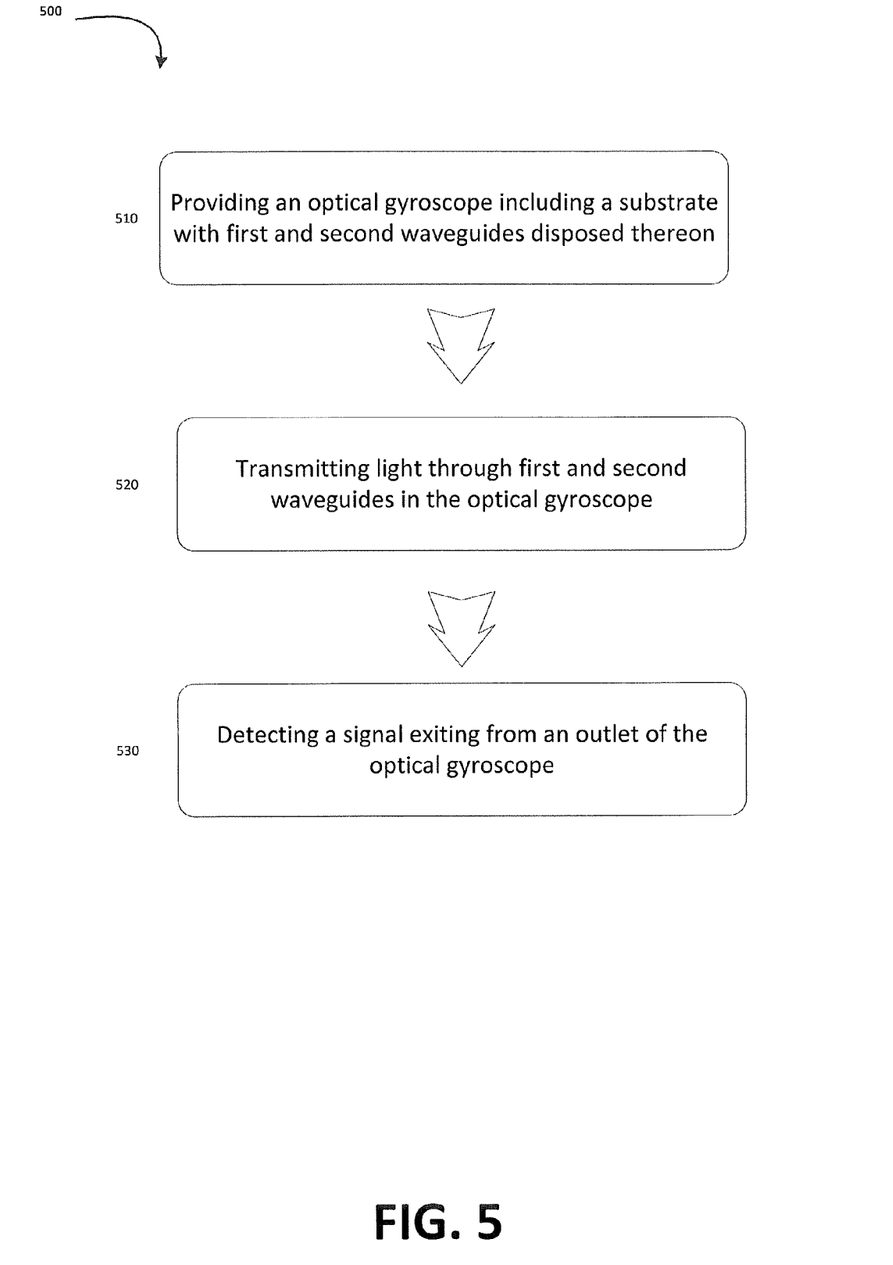
FIG. 5 illustrates a method for observing characteristics of an optical gyroscope according to an embodiment of the application.

Yet another aspect of the application is directed to a method 500 for observing optical characteristics of an optical gyroscope. The method includes a step of providing an optical gyroscope including a substrate, and a first and second waveguide disposed on the substrate (Step 510). The first waveguide is doped with a rare-earth material such as described above in the application. A crossing element connected the first and the second waveguides. The method also includes a step of transmitting light through the first and the second waveguide in the optical gyroscope (Step 520). Moreover, the method includes a step of detecting a signal exiting from an outlet of the optical gyroscope (Step 530). According to another embodiment, the light is transmitted from a signal source and a pump source each emitting a wavelength of light. According to even another embodiment, the wavelength of light emitted by the signal source ranges from about 1000 to 2100 nm, and the wavelength of light emitted by the pump source ranges from about 800 to 1000 nm. In turn, sensitivity may be increased by at least two orders of magnitude. In particular, the detected signal may be less than 10°/h. In a preferred embodiment, the resolution may be less than 5°/h. In yet even a more preferred embodiment, the resolution is less than 1°/h.

In another embodiment, a detection of the bias drift of the optical gyroscope 300 may be improved to less than 5°/h. In a preferred embodiment, the bias drift may be improved to less than 4°/h. In a more preferred embodiment, the bias drift may be improved to less than 3°/h. In yet even a more preferred embodiment, the bias drift may be improved to less than 2°/h.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. An optical gyroscope comprising:
   a substrate;
   a first waveguide disposed on the substrate, the first waveguide being doped with rare-earth material;
   a second waveguide disposed on the substrate; and
   a crossing element connecting the first waveguide and the second waveguide so as to form a substantially orthogonal connection therebetween;
   wherein the first and the second waveguides are configured in a loop, and the loop is entirely disposed on an area of the substrate.

2. The optical gyroscope of claim 1, wherein the second waveguide is doped with rare-earth material.

3. The optical gyroscope of claim 2, wherein the rare-earth material is selected from elements consisting of yttrium, lanthanum, cerium, praseodymium, neodymium, promethium, samarium, europium, gadolinium, terbium, dysprosium, holmium, erbium, thulium, ytterbium, lutetium and combinations thereof.

4. The optical gyroscope of claim 1, further comprising:
   a lower cladding layer disposed below the first and the second waveguides;
   an upper cladding layer disposed above the first and the second waveguides;
   a core of the first waveguide being doped with a rare-earth material, wherein
   the upper and the lower cladding layers have a lower index of refraction than the core of the first waveguide.

5. The optical gyroscope of claim 1, wherein the first and the second waveguides include a material selected from silica glass, alumina, silicon and combinations thereof.

6. The optical gyroscope of claim 1, wherein the first and the second waveguides include a dopant selected from boron, germanium, phosphor, aluminum, sodium, lithium, potassium, rubidium, cesium and combinations thereof.

7. The optical gyroscope of claim 1, wherein a number of the crossing element and the loop are disposed on the substrate according to the equation "crossing element=loops−1".

8. The optical gyroscope of claim 1, further comprising:
   a total area less than about 50 cm$^2$.

9. The optical gyroscope of claim 1, wherein the first and the second waveguides are each greater than 1 meter in length.

10. A system comprising:
    a light source for emitting light;
    a wavelength division multiplexer having an inlet and an outlet, the inlet of the wavelength division multiplexer being in optical communication with the light source and adapted to receive light therefrom;

an optical gyroscope having an inlet and an outlet, the inlet being in optical communication with the wavelength division multiplexer and adapted to receive the light exiting the outlet of the wavelength division multiplexer, the optical gyroscope including:

a substrate;

a first waveguide disposed on the substrate, the first waveguide being doped with rare-earth material;

a second waveguide disposed on the substrate; and a crossing element connecting the first waveguide and the second waveguides to form a connection therebetween;

wherein the first and the second waveguides are configured in a loop, and the loop is entirely disposed on an area of the substrate;

a first photodetector connected to the optical gyroscope, the first photodetector being adapted to detect intensity of the light entering the optical gyroscope;

a second photodetector connected to the optical gyroscope, the second photodetector being adapted to detect a signal exiting from the outlet of the optical gyroscope; and a lock-in amplifier connected to the first and the second photodetectors, the lock-in amplifier being adapted to measure the detected signal.

11. The system of claim 10, further comprising:

a feedback controller located downstream of the first and the second photodetectors and being adapted to adjust the intensity of the light emitted by the light source.

12. The system of claim 10, wherein the light source includes a signal source and a pump source each emitting a wavelength of light.

13. The system of claim 10, wherein the connection is substantially orthogonal.

14. The system of claim 10, wherein the second waveguide is doped with rare-earth material.

15. A method for observing optical characteristics of an optical gyroscope comprising:

providing an optical gyroscope including:

a substrate;

a first waveguide disposed on the substrate, the first waveguide being doped with rare-earth material;

a second waveguide disposed on the substrate; and a crossing element connecting the first waveguide and the second waveguide to form a connection therebetween;

wherein the first and the second waveguides are configured in a loop, and the loop is entirely disposed on an area of the substrate;

transmitting light through the first and second waveguides in the optical gyroscope; and detecting a signal exiting from an outlet of the first optical gyroscope.

16. The method of claim 15, wherein the detected signal exhibits a resolution less than about 10°/h.

17. The method of claim 16, wherein the detected signal exhibits a resolution less than about 5°/h.

18. The method of claim 15, wherein a wavelength of light emitted by a signal source ranges from about 1000 to 2100 nm, and a wavelength of light emitted by a pump source ranges from about 800 to 1000 nm.

19. The apparatus of claim 1, wherein the crossing element includes ends that mate with ends of the first waveguide and the second waveguide.

20. The system of claim 10, wherein a number of the crossing element and the loop are disposed on the substrate according to the equation "crossing element=loops−1".

* * * * *